Aug. 7, 1951  E. H. LAND  2,563,342
PHOTOGRAPHIC PRODUCT AND PROCESS
Filed Jan. 28, 1947

INVENTOR.
Edwin H. Land
BY Donald L. Brown
Attorney

Patented Aug. 7, 1951

2,563,342

UNITED STATES PATENT OFFICE 2,563,342

PHOTOGRAPHIC PRODUCT AND PROCESS

Edwin H. Land, Cambridge, Mass., assignor to Polaroid Corporation, Cambridge, Mass., a corporation of Delaware Application January 28, 1947, Serial No. 724,783

20 Claims. (Cl. 95—6)

This application relates to photography and more particularly to novel photographic film units and processes.

A principal object of the present invention is to provide a photographic process wherein positive image-forming components are created during the development of an exposed photosensitive layer having therein a latent negative image, said image-forming components are transferred through an opaque layer, and a positive image is formed from said image-forming components adjacent the surface of said opaque layer farthest from said photosensitive layer.

Another object of the the invention is to provide a composite liquid-containing photographic film unit which is simple to handle within a camera and wherein no separation of the various layers thereof is required for exposure of the photosensitive layer or for viewing a final positive image created by processing said photographic film unit.

Another object of the present invention is to provide a photographic film unit of the above type wherein a greater resistance to curling of a final positive image is achieved when processing of said film unit is accomplished by the creating therein of a layer of a liquid composition.

Another object of the present invention is to provide a composite photographic film unit of the type described above wherein two positive images are obtained and said images may be separated for final viewing.

Other objects of the invention will in part be obvious and will in part appear hereinafter.

The invention accordingly comprises the product possessing the features, properties and the relation of components, and the process involving the several steps and the relation and the order of one or more of such steps with respect to each of the others, which are exemplified in the following detailed disclosure, and the scope of the application of which will be indicated in the claims.

Figure 1:
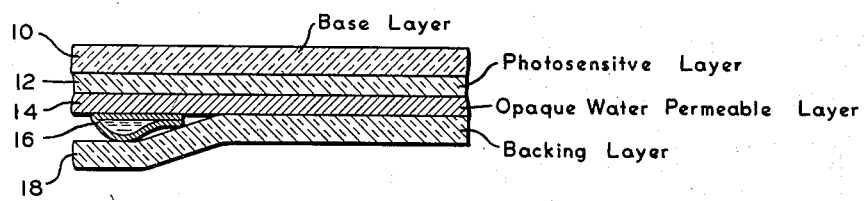
Figure 2:
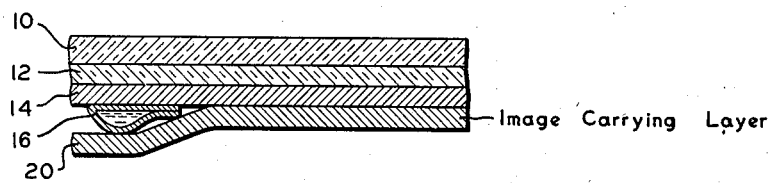

For a fuller understanding of the invention, reference should be had to the following detailed description taken in conection with the accompanying drawing wherein:

Figure 1 is an exaggerated sectional view of one form of the present invention; and Fig. 2 is an exaggerated sectional view of another modification of the invention.

This invention relates to photographic film units which may be exposed in a camera without separating any of the layers, and which can, by use of the novel process of the invention, be processed to produce therein a positive image which may be viewed from a side thereof opposite that which is exposed to light. Thus, a final positve image may be obtained without separating any of the layers of the film unit.

A preferred film unit comprises a silver halide photosensitive layer, an opaque permeable layer adjacent a surface of said photosensitive layer, and a backing layer. The opaque layer is preferably a good protective colloid such as gelatin, is white, and serves as a background for a black positive image formed on the surface of said white layer farthest from said photosensitive layer. The backing layer is preferably transparent and assists in spreading a liquid composition between the backing layer and the opaque white layer. This liquid composition is preferably included in a container therefor which is mounted in the film so as to release its liquid between the backing layer and the opaque layer upon being subjected to a mechanical stress.

For processing such a film unit the liquid composition preferably comprises an alkaline aqueous solution of a developer, a silver halide solvent, and a film-forming material which is a poorer protective colloid than the gelatin of the oqaque layer. When such a liquid composition is spread in a film between the opaque layer and the backing layer, the film-forming material creates a dimensionally stable film, the developer develops a latent image in said photosensitive layer, soluble image-forming complexes are formed by means of said silver halide solvent, these soluble image-forming complexes are transferred through the opaque water-permeable layer to said formed film, and the soluble image-forming complexes are converted into a visible positive image within said formed film.

In a preferred modification of the invention, as shown in Fig. 1, there is provided a transparent base layer 10 which is preferably formed from a cellulosic film base such as cellulose acetate, cellulose acetate propionate, or cellulose acetate butyrate. This base layer 10 carries on its inner surface a layer 12 of photosensitive material. There is also provided another layer 14 attached thereto. This other layer 14 preferably comprises a good protective colloid, is opaque and white, and forms a water-permeable unit with the photosensitive layer. In addition to the opaque water-permeable layer there is provided still another layer 18 which acts as a backing layer. Between the backing layer and the opaque layer there is preferably positioned a container 16 having therein a liquid composition. The edges of the film unit may be sealed together so that the liquid released from the container cannot escape from the composite film unit.

The liquid composition preferably comprises an aqueous solution of developer and a polymeric cellulosic film-forming material. This film-forming material preferably is a material in which positive image-forming components will form more readily than in the opaque permeable layer. For the opaque permeable layer, good protective colloids such as gelatin or polyvinyl alcohol may be utilized; while for the film-forming material, various poor protective colloids such as water-soluble polymeric cellulosic compounds, i. e., sodium carboxymethyl cellulose, hydroxyethyl cellulose, and sodium alignate are preferred.

The opaque, white, water-permeable layer 14, which is preferably formed of gelatin, has incorporated therein a sufficient quantity of titanium dioxide to make the layer 14 opaque and white. A preferred composition for the layer 14 comprises 10 grams of titanium dioxide, 5 grams of gelatin and 100 cc. of water. The backing layer 18 may be relatively impermeable transparent material such as cellulose acetate. The container 16 preferably includes an aqueous solution of a developer, a silver halide solvent, an alkali, and a cellulosic water-soluble film-forming material which is not hydrolyzed by the alkali. In a preferred modification of the invention, this liquid composition comprises an aqueous solution of hydroquinone, sodium thiosulfate, sodium hydroxide, sodium sulfite, and sodium carboxymethyl cellulose. The liquid composition may, in certain cases, also include a buffer such as sodium citrate.

A preferred liquid composition is prepared in the following manner: 93 grams of sodium carboxymethyl cellulose (Hercules #1362 Medium Viscosity) are dissolved in 1860 grams of water in a mixer at room temperature and mixed for one hour. Then 78 grams of sodium sulfite, 74.6 grams of sodium hydroxide, 14.5 grams of sodium thiosulfate and 38.5 grams of citric acid are added to the solution under an inert atmosphere. When the above materials are dissolved, 52.0 grams of hydroquinone are added and the solution is mixed for another hour at room temperature under nitrogen.

The film unit may also include a lead salt capable of having a lead ion released therefrom when contacted by an alkaline liquid composition of the type described above. Such a lead salt may, for example, be lead acetate, lead nitrate, lead citrate or lead carboxymethyl cellulose. These lead salts are preferably coated on the inner surface of layer 14 where they are contacted by the liquid composition as it is spread between layers 14 and 18.

Container 16 is preferably formed of a paper-backed metal foil, coated on its inner surface with a resin, such as polyvinyl butyral, which is inert to alkalies.

In the use of the preferred modification of the invention the film unit may be positioned in a camera so as to permit exposure of the photosensitive layer 12 through the base layer 10. After exposure, the firm unit is processed by releasing the liquid from the container 16 and spreading it in a uniform layer between layers 14 and 18. This release may be accomplished, in a preferred manner, by running the film unit through a pair of pressure rollers, the container end going first.

After the liquid composition has been spread between layers 14 and 18, the developer develops the exposed photosensitive material, and the silver halide solvent forms, with the unexposed and undeveloped portions of the photosensitive material, soluble silver complexes which are transferred from the photosensitive layer 12 through the opaque permeable layer 14 and into the layer of liquid composition where the film-forming material is being converted from a fluid to a dimensionally stable film. The soluble silver image-forming complexes are then reduced to visible particles comprising silver by the unused developer which remains in the liquid layer.

It has been found that the use of the water-permeable gelatin layer 14, which is formed into a water-permeable assembly with the photosensitive layer 12, permits the transfer of soluble silver complexes through this gelatin layer while preventing development of the complexes to silver within the gelatin layer. This is believed to be due to the fact that gelatin is a better protective colloid than is the sodium carboxymethyl cellulose, and thus the gelatin apparently inhibits silver precipitation, while the sodium carboxymethyl cellulose encourages precipitation of the silver. The positive image is formed consequently, not in the gelatin opaque layer, but rather in the film created by the film-forming material, i. e., the sodium carboxymethyl cellulose, from the container 16.

In a preferred modification of the invention, the layer of liquid composition, which is spread between layers 14 and 18, is so adjusted in thickness that, for a particular unit of area thereof, there will be not much more than enough developer to fully develop a fully developable portion of the photosensitive layer 12.

One function of the lead salt is to insolubilize the film-forming material, when sodium carboxymethyl cellulose is used, by forming cross-linkages therewith. The lead salt may also react with some of the elements of the liquid composition in the area of the highlights so as to lower the alkalinity at least in the highlights to prevent staining thereof by excess developer. The lead salt may also act to increase the density of the shadows in the positive image, and increase the contrast the gamma of the positive image. This lead salt may comprise a lead sulfide which has the beneficial effect of increasing the density of the positive image in those cases where the photosensitive layer contains a relatively high quantity of iodide.

In the modification of the invention discussed above, the process of spreading the liquid composition between the opaque layer 14 and the backing layer 18 creates a final positive image in the film formed by the film-forming material in the liquid composition. This final positive image may be viewed through the transparent backing layer 18 and the backing layer 18 may act as a protective coating for the final positive image. It can be seen therefore that the modification of the invention shown in Fig. 1 permits the exposure of a composite photographic film unit from one side thereof and viewing of the positive image from the other side thereof. It is not necessary to separate any of the layers of the composite unit for either exposure, processing or viewing.

Since the positive image is supported on the relatively non-curling base layer 10, it remains flat during and after processing. Thus, this modification of the invention has the additional advantage that the relatively expensive base layer 10 is utilized as a support for the final positive image and imparts desirable physical characteristics thereto.

In some cases, it is desirable to utilize, in place of a transparent backing layer 18, an opaque, white image-carrying layer formed of a material such as baryta paper. It has been found that with such a film unit there are two positive images formed; one is formed in the film created by the film-forming material, and the other is formed on and within the surface of the baryta image-carrying layer. Such a modification of the invention is shown in Fig. 2 where like numbers correspond to like elements of Fig. 1.

In this Fig. 2 the transparent backing layer 18 is replaced by an opaque, white image-carrying layer 20. Such an image-carrying layer 20 is preferably formed of a material known in the art as baryta paper. If such a paper is utilized, it is preferred that the inner surface thereof, i. e., that surface to be contacted by the liquid composition, be so treated that the film formed adjacent to that surface will not adhere to that surface. It has been found that a nonadhering surface can be created on baryta paper by first coating the sheet with a 45% water solution of lead acetate and then coating with a 5% to 40% water-soap solution such a solution of Ivory soap. This creates a surface which may be readily stripped from the formed film and one which contains lead in a form capable of releasing lead ions to an alkaline solution. In a preferred form of the modification shown in Fig. 2, the materials employed therein are the same as those stated as being preferable in the discussion of Fig. 1.

In the use of such a film unit having a baryta image-carrying layer, the film unit is exposed and processed in the same manner as mentioned in connection with the discussion of Fig. 1. However, after processing, it is necessary to strip the image-carrying layer 20 from the remainder of the film so that the positive image in the film created by the film-forming material may be viewed. This modification of the invention, therefore, has the added advantage that two positive images are obtained from one layer of photosensitive material and both positive images are stable final images. It should be apparent, however, that the image formed on the baryta image-carrying layer 20 is geometrically reversed with respect to the image formed in the film-forming material in the liquid from container 16. Such a second image, due to its geometric reversal, may not be desirous from an artistic standpoint, but it has definite utility in many cases where geometric reversal is not important, and may serve as a master for copy work.

In some cases where it is desired to intensify the image formed on the surface of the image-carrying layer 20, this result may be accomplished by the use of a material having a strong precipitating effect upon the soluble silver complex. Such a material may comprise lead sulfide formed on the image-carrying layer. With such an image-carrying layer, the lead sulfide encourages precipitation of the colloidal particles of silver on the image-carrying layer, thus strengthening the second positive image.

In some cases it may be desirable to utilize a film-forming material which, during the processing of the photographic film, is converted to a positive image-receiving layer, and it is desired to give this film greater depth. In such a case, a portion of such a film is first coated on one of the surfaces adjacent to the space wherein this film-forming material is to be spread. This precoated layer of film-forming material may also include many or all of the active ingredients of the liquid composition normally included in the container. It is thus necessary to include in the container only a solvent for these ingredients or a solvent, an alkali and the film-forming material.

In a less preferred form of the present invention, the backing layer 18 may be eliminated from the film unit of Fig. 1, and the liquid composition in container 16 can be spread in contact with the surface of the opaque layer by means such as a pair of pressure rollers, or a plate and roller. This modification of the invention is less preferred for use in a hand camera since it requires a portion of the processing apparatus to contact the liquid, and since it does not have the inherent features of oxygen exclusion present in the film unit of Fig. 1. This feature of the invention is feasible in special applications however, and within the scope of the present invention.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A photographic product comprising at least two layers and including a photosensitive silver halide emulsion layer, an opaque water-permeable layer of a colloid in a solid phase, and a rupturable container holding a liquid processing composition, said photosensitive layer and said opaque colloid layer being secured together in superposed, contacting relation and said container being located at a position for releasing its liquid content upon the rupture thereof over that surface of said opaque colloid layer which is furthest removed from said photosensitive layer for permeation, at least in part, into said superposed opaque colloid layer and said photosensitive layer, said liquid processing composition comprising a liquid solvent containing at least an organic film-forming colloid, said product having positioned therein photographic processing material, including a silver halide developer, transportable by said liquid to said photosensitive layer and a silver halide solvent also transportable by said liquid to said photosensitive layer and capable of forming soluble silver complex with undeveloped silver halide, said organic film-forming colloid being characterized by its ability to solidify upon the absorption of liquid therefrom whereby to provide a substantially transparent solid coating on the surface of said opaque colloid layer with which the film-forming colloid is adapted to be brought into contact upon discharge of the container contents and the absorption of liquid therefrom by said superposed opaque colloid and photosensitive layers, silver complex formed in said photosensitive layer being adapted to be transported in solution through said opaque layer and into said transparent solid coating provided by said organic film-forming colloid where said silver complex is precipitated to provide a transfer image which is a positive of a negative latent image formed in said photosensitive layer and which is viewable against said opaque layer as a background.

2. A photographic product as set forth in claim 1 which includes an additional layer located in superposed relation to said photosensitive and opaque colloid layers on the side of said opaque colloid layer furthest removed from said photosensitive layer, said container being positioned in said product with respect to said opaque colloid layer and said additional layer for releasing its liquid content therebetween and wherein the opaque colloid layer of said product has dispersed therein a material adapted to provide a background against which silver of said positive image is readily visible.

3. A photographic product as defined in claim 1 having a transparent layer of film base material on which said photosensitive layer is supported, said film base material being located on the surface of said photosensitive layer furthest removed from said opaque colloid layer and said photosensitive layer being exposable through said film base material, and wherein said opaque colloid layer has a substantially white pigment uniformly distributed therein.

4. A photographic product of the character set forth in claim 1 wherein the materials constituting said opaque water-permeable layer and said organic film-forming colloid are both organic plastic materials and wherein said opaque layer is substantially white.

5. A photographic product as set forth in claim 1 wherein said opaque colloid layer is formed of gelatin and has a substantially white pigment dispersed therein and wherein said organic film-forming colloid is sodium carboxymethyl cellulose.

6. A photographic product as set forth in claim 1 wherein said silver halide developer and said silver halide solvent are contained in solution in said container and wherein said opaque colloid layer is substantially white.

7. In a photographic product which is employed in carrying out a silver halide transfer process and which includes a photosensitive silver halide layer and a rupturable container for a liquid processing composition comprising a liquid solvent containing at least an organic film-forming colloid and wherein said product has positioned therein photographic processing material, including a silver halide developer, transportable by said liquid to said photosensitive layer and a silver halide solvent also transportable by said liquid to said photosensitive layer and capable of forming soluble silver complex with undeveloped silver halide, in combination, an opaque water-permeable layer of a colloid in a solid phase superposed in contacting relation with that surface of said photosensitive layer opposite the surface of the photosensitive layer through which exposure is made, said rupturable container being positioned for releasing its liquid content upon rupture thereof over that surface of said opaque colloid layer which is furthest removed from said photosensitive layer for permeation, at least in part, into said superposed opaque colloid layer and said photosensitive layer, said organic film-forming colloid being characterized by its ability to solidify upon the absorption of solvent liquid therefrom whereby to provide a substantially transparent solid coating on the last-named surface of said opaque colloid layer upon discharge of the container contents thereon and the absorption of liquid from said contents by said superposed opaque colloid and photosensitive layers to provide a transparent permeable layer adapted to receive soluble silver complex transported thereto from said photosensitive layer and through said opaque colloid layer, said opaque colloid layer being characterized by the fact that it provides a poorer protective colloid for said silver complex than does said organic film-forming colloid whereby silver complex, transferred in solution from said photosensitive layer, will be precipitated substantially exclusively within said solid coating to provide a positive image of a negative latent image formed in said photosensitive layer upon the exposure thereof, and said opaque colloid layer being further characterized by having a substantially white pigment distributed therein whereby said opaque colloid layer provides a background for viewing the positive image.

8. A composite photographic film unit comprising at least three layers and including a photosensitive silver halide emulsion layer, a substantially white, opaque, water-permeable layer of a colloid in a solid phase, a layer of a substantially transparent material through which said white, opaque, colloid layer is adapted to be viewed, and a rupturable container holding a liquid processing composition comprising a liquid solvent containing at least an organic film-forming colloid characterized by its ability to solidify upon absorption of solvent liquid therefrom, said layers and said container being permanently attached together with said layers superposed in such relation that said photosensitive layer and said transparent viewing layer are outermost and with said container so positioned in said unit as to be capable of being ruptured and of releasing its liquid content between said opaque colloid layer and said transparent viewing layer for permeation at least into said opaque colloid layer and said photosensitive layer, said unit having positioned therein photographic processing material transportable by said liquid to said photosensitive layer and comprising a photographic developer and a substance for forming a soluble silver compex with unexposed silver halide, said photographic processing material, when transported to said photosensitive layer, being capable of developing a latent image therein and of causing the formation of a soluble silver complex transportable in solution through said opaque colloid layer for providing an image by transfer in transparent image-receptive material adapted to be provided by solidified organic film-forming colloid located between said transparent viewing layer and said opaque colloid layer as a result of the release of the liquid contents of said container and the development of latent image in said photosensitive layer, said transparent viewing layer permitting a silver image formed from silver complex deposited in image-receptive material provided by said organic film-forming colloid to be viewed against a white background in the form of said opaque colloid layer.

9. A composite photographic film unit of the character set forth in claim 8 having a transparent layer of film base material supporting said photosensitive layer on the side thereof furthest removed from said opaque colloid layer and wherein said film unit is adapted to be exposed through said film base material.

10. A composite photographic film unit comprising at least three layers and including a photosensitive silver halide emulsion layer, a substantially white, opaque, water-permeable layer of a colloid in a solid phase, a permeable opaque image-receiving layer, and a rupturable container holding a liquid processing composition comprising a liquid solvent having dissolved therein at least an organic film-forming colloid which is characterized by its ability to form a transparent, water-permeable, substantially solid, image-receptive material upon absorption of the liquid solvent therefrom to increase the concentration thereof, said layers being arranged in superposed relation wherein said photosensitive layer and said image-receiving layer are outermost with said opaque colloid layer being intermediate and in contact with said photosensitive layer and said image-receiving layer, said image-receiving layer being strippable from said superposed relation and said container being so positioned in said unit as to be capable of being ruptured and of releasing its liquid content between said opaque colloid layer and said image-receiving layer for permeation into the superposed layers of said unit, said unit having positioned therein photographic processing material transportable by said liquid to said photosensitive layer and comprising a photographic developer and a substance for forming a soluble silver complex with unexposed silver halide, said photographic processing material, when transported to said photosensitive layer, being capable of developing a latent image therein and of causing the formation of a soluble silver complex transportable in solution through said opaque colloid layer and into transparent, permeable, image-receptive material adapted to be provided by organic film-forming colloid released between said image-receiving layer and said opaque colloid layer and solidified by the absorption of liquid from said processing composition by the photosensitive layer for providing an image by transfer in said image-receptive material of solidified organic film-forming colloid, said silver complex also being transportable, at least in part, through said permeable image-receptive material of solidified organic film-forming colloid and into said image-receiving layer for providing an image by transfer in said image-receiving layer, each said transfer image being a positive image of a single negative latent image formed in said photosensitive element by the exposure of said unit through the outermost surface of said photosensitive layer and both said positive transfer images being adapted to be viewed upon stripping said receiving layer from said unit, the positive transfer image in said image-receptive material being viewable against the white background provided by said opaque colloid layer.

11. A composite photographic film unit as set forth in claim 10 having a transparent layer of film base material supporting said photosensitive layer on the side thereof furthest removed from said opaque colloid layer, and wherein said film unit is adapted to be exposed through said film base material and the positive transfer image formed in the image-receptive layer of solidified organic film-forming colloid is adapted to be viewed from the side of said unit furthest removed from said film base material.

12. A composite photographic film unit as set forth in claim 10 wherein a transparent layer of film base material supports said photosensitive layer on the side thereof furthest removed from said opaque colloid layer and wherein said image-receiving layer is baryta.

13. A composite photographic film unit of the character defined in claim 10 wherein the surface of said image-receiving layer adapted to be located adjacent said opaque layer is coated with a film having a lesser affinity for said organic film-forming colloid in its solid state than the solid organic film-forming colloid has for the surface of said opaque colloid layer whereby said opaque image-receiving layer is readily strippable from said film unit after processing of the unit to carry out positive image formation.

14. In a transfer process wherein a liquid processing composition comprising a photographic developer and a silver halide solvent is permeated into a photosensitive silver halide emulsion layer containing a latent image whereby to develop said latent image to silver and to form with unexposed silver halide a silver complex and wherein said complex in solution in said composition is adapted to be transferred by inbibition from said photosensitive layer to image-receptive material adapted to be located in superposed relation to said photosensitive layer, said transferred complex being adapted to be developed by said developer in said image-receptive material to form therein a reversed image of said latent image, the improvement which comprises providing a substantially white background against which said reversed image is viewable by transferring said soluble silver complex in solution through an opaque, substantially white, water-permeable layer of a colloid in a solid phase positioned in superposed contacting relation to said photosensitive layer on the side thereof opposed to that through which exposure is made and adapted to be located between said photosensitive layer and image-receptive material, and forming a transparent solid coating of an image-receptive organic film-forming colloid on the surface of said opaque colloid layer furthest removed from said photosensitive layer by spreading onto said surface a liquid processing composition in which said developer and silver halide solvent are soluble and which contains, in solution, an organic film-forming colloid characterized by its ability to solidify upon the absorption of solvent liquid therefrom.

15. A transfer process of the character set forth in claim 14 wherein said liquid processing composition is introduced between the surface of said opaque colloid layer furthest removed from said photosensitive layer and another layer for spreading in contact over said opaque colloid layer, said other layer being in superposed relation to said opaque colloid layer on the side thereof furthest removed from said photosensitive layer.

16. A transfer process as defined in claim 14 wherein said opaque colloid layer and said film-forming colloid are both organic plastic materials.

17. A transfer process as defined in claim 14 wherein said opaque colloid layer is provided by gelatin and wherein said organic film-forming colloid is provided by sodium carboxymethyl cellulose.

18. A transfer process as defined in claim 14 wherein said opaque colloid layer is characterized by being formed of a colloid which is more highly protective to silver complex in solution in said liquid composition than is the organic film-forming colloid adapted to form said transparent solid layer adjacent said opaque colloid layer whereby to permit silver complex to be precipitated in solidified organic film-forming colloid substantially to the exclusion of the precipitation of silver complex in said opaque colloid layer.

19. In a transfer process wherein a liquid processing composition comprising a photographic developer and a silver halide solvent is permeated into a photosensitive silver halide emulsion layer containing a latent image whereby to develop said latent image to silver and to form with unexposed silver halide a silver complex and wherein said complex in solution in said composition is adapted to be transferred by imbibition from said photosensitive layer to image-receptive material adapted to be located in superposed relation to said photosensitive layer, said transferred complex being adapted to be developed by said developer in said image-receptive material to form therein a reverse image of said latent image, the improvement which comprises forming said reverse image between a substantially white background and a transparent plastic layer through which said reverse image is viewable against said white background by transferring said soluble silver complex in solution through an opaque, substantially white, water-permeable layer of a colloid in a solid phase positioned in superposed contacting relation to said photosensitive layer on the side thereof opposed to that through which exposure is made and adapted to be located between said photosensitive layer and image-receptive material, and forming a transparent solid stratum of an image-receptive organic film-forming colloid between and in contact with the surface of said opaque colloid layer furthest removed from said photosensitive layer and the surface of said transparent plastic layer nearest said opaque colloid layer by spreading onto and in contact with said surfaces a liquid processing composition in which said developer and silver halide solvent are soluble and which contains, in solution, an organic film-forming colloid characterized by its ability to solidify upon the absorption of solvent liquid therefrom whereby said reverse image is provided in a composite structure comprising said photosensitive layer, said opaque colloid layer, said solid image-receptive material and said transparent layer for viewing without the removal of any of said layers and stratum of image-receptive material forming said structure from the side of said structure opposed to that through which the photosensitive layer was exposed.

20. In a transfer process wherein a liquid processing composition comprising a photographic developer and a silver halide solvent is permeated into a photosensitive silver halide emulsion layer containing a latent image whereby to develop said latent image to silver and to form with unexposed silver halide a silver complex and wherein said complex in solution in said composition is adapted to be transferred by imbibition from said photosensitive layer to an image-receiving layer adapted to be removably positioned in superposed relation to said photosensitive layer, said transferred complex being adapted to be developed by said developer in said image-receiving layer to form therein a reverse image of said latent image, the improvement which comprises forming in addition to said reverse image in said image-receiving layer a second reverse image of said latent image in a transparent stratum of a permeable image-receptive material by transferring said soluble silver complex in solution through a substantially white, opaque, water-permeable layer of a colloid in a solid phase positioned in superposed contacting relation with said photosensitive layer between said photosensitive layer and said image-receiving layer on the side of said photosensitive layer opposed to that through which exposure is made, forming a transparent solid stratum of an image-receptive organic film-forming colloid between and in contact with the surface of said opaque colloid layer furthest removed from said photosensitive layer and the surface of said image-receiving layer nearest said opaque colloid layer by spreading between and in contact with said surfaces a liquid processing composition in which said developer and said silver halide solvent are soluble and which contains, in solution, an organic film-forming colloid characterized by its ability to solidify upon the absorption of solvent liquid therefrom, said layers and said stratum of image-receptive material being retained in their superposed condition until there is transported from the photosensitive layer and through said opaque colloid layer and into said stratum of image-receptive material provided by said solidified organic film-forming colloid and also into said image-receiving layer a quantity of said soluble silver complex sufficient to provide a visible reverse image of said latent image individually in said formed stratum of image-receptive material and in said image-receiving layer, and stripping said image-receiving layer from said transparent stratum of image-receptive organic film-forming colloid while leaving said stratum attached to said opaque permeable layer whereby said reverse image in said image-receiving layer becomes visible upon observation from the side of said image-receiving layer which was adjacent said stratum of image-receptive material and whereby said reverse image in said stratum of image-receptive material becomes viewable from the side of said stratum most distant from said photosensitive layer against the white background provided by said substantially white opaque colloid layer.

EDWIN H. LAND.

REFERENCES CITED

The following references are of record in the file of this patent:

UNITED STATES PATENTS

| Number | Name | Date |
| --- | --- | --- |
| 742,405 | Eichengrun | Oct. 27, 1903 |
| 1,841,653 | van der Grinten | Jan. 19, 1932 |
| 1,956,230 | Schmidt | Apr. 24, 1934 |
| 2,171,609 | Snyder | Sept. 5, 1939 |
| 2,315,966 | Knott | Apr. 6, 1943 |
| 2,322,037 | Lindquist | June 15, 1943 |
| 2,328,034 | Sease | Aug. 31, 1943 |
| 2,350,380 | White | June 6, 1944 |
| 2,352,014 | Rott | June 20, 1944 |
| 2,363,764 | White | Nov. 28, 1944 |
| 2,369,171 | Murray | Feb. 13, 1945 |
| 2,386,167 | Murray | Oct. 2, 1945 |
| 2,397,452 | White | Mar. 26, 1946 |

FOREIGN PATENTS

| Number | Country | Date |
| --- | --- | --- |
| 108,728 | Switzerland | Oct. 10, 1923 |
| 392,424 | Great Britain | May 18, 1933 |
| 879,995 | France | Dec. 10, 1942 |

OTHER REFERENCES

Photographische Correspondenz Nr. 448, pp. 9–10, 1898.